United States Patent [19]

Rath

[11] Patent Number: 4,735,537
[45] Date of Patent: Apr. 5, 1988

[54] THREAD ROLLING AND FASTENER

[75] Inventor: Jack Rath, Los Angeles, Calif.

[73] Assignee: Deutsch Fastener Corp., Lakewood, Calif.

[21] Appl. No.: 887,128

[22] PCT Filed: Oct. 7, 1985

[86] PCT No.: PCT/US85/01954
§ 371 Date: Jan. 13, 1986
§ 102(e) Date: Jan. 13, 1986

[87] PCT Pub. No.: WO86/02416
PCT Pub. Date: Apr. 24, 1986

[51] Int. Cl.⁴ .................. F16B 35/04; B21H 3/06; B21D 37/10
[52] U.S. Cl. ........................ 411/411; 72/88; 72/469
[58] Field of Search .............. 72/88, 90, 103, 104, 72/108, 469; 10/152 R, 153; 411/333–335, 360, 361, 365, 378, 411, 412, 414, 423–426, 3

[56] References Cited

U.S. PATENT DOCUMENTS

| | | |
|---|---|---|
| 302,600 | 7/1884 | Stetson . |
| 446,042 | 2/1891 | Warren . |
| 1,907,684 | 7/1931 | Thomson . |
| 1,966,835 | 7/1934 | Stites ........................... 85/1 |
| 2,010,228 | 8/1935 | Gibbs ........................... 153/72 |
| 2,150,875 | 3/1939 | Caminez ...................... 29/148 |
| 2,243,138 | 5/1941 | Von Till et al. ............. 153/72 |
| 2,303,224 | 11/1942 | Olson ........................... 10/10 |
| 2,321,375 | 6/1943 | Erdman ........................ 80/9 |
| 2,895,367 | 7/1959 | Nagy ............................ 85/1 |
| 3,245,142 | 4/1966 | Williams ...................... 29/446 |
| 3,746,067 | 7/1973 | Gulistan ....................... 151/69 |
| 3,896,656 | 7/1975 | Orlomoski ................... 72/469 |
| 3,915,052 | 10/1975 | Ruhl ............................ 85/7 |
| 4,034,586 | 7/1977 | Corrette ....................... 72/88 |
| 4,050,833 | 9/1977 | Briles ........................... 403/405 |
| 4,326,825 | 4/1982 | Volkmann et al. .......... 411/5 |

FOREIGN PATENT DOCUMENTS 1507114 1/1967 France .
810394 3/1959 United Kingdom .

Primary Examiner—Daniel C. Crane
Attorney, Agent, or Firm—Gausewitz, Carr & Rothenberg

[57] ABSTRACT

This invention provides a fastener having a shank with a relatively abrupt transition from an unthreaded portion to a full thread dimension, the thread runout occupying no more than one pitch length of the thread in the axial dimension, and circumferentially extending no more than about one-fourth of the circumference of the thread at its pitch diameter. The counterbore of the nut is reduced in length in light of the short transition section of the shank. The threads are rolled on the shank by opposed dies having ridges complementary to the thread to be produced which run out at one edge of the die with spaced, generally symmetrical end walls which are relatively short axially of the ridges so that the full thread dimension is achieved abruptly.

5 Claims, 3 Drawing Sheets

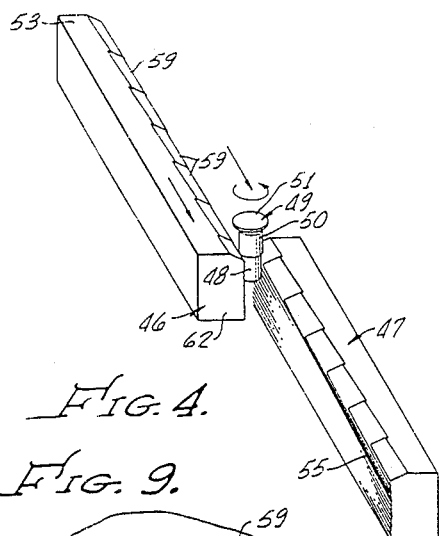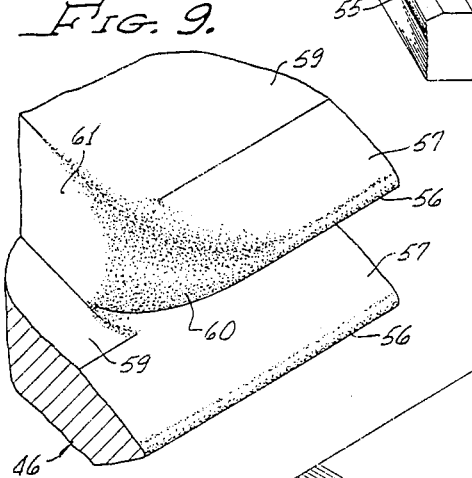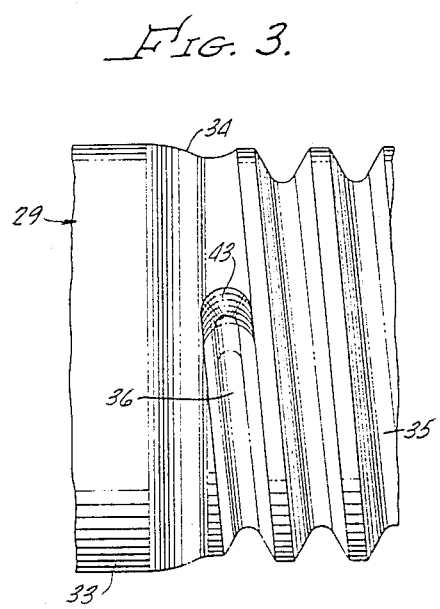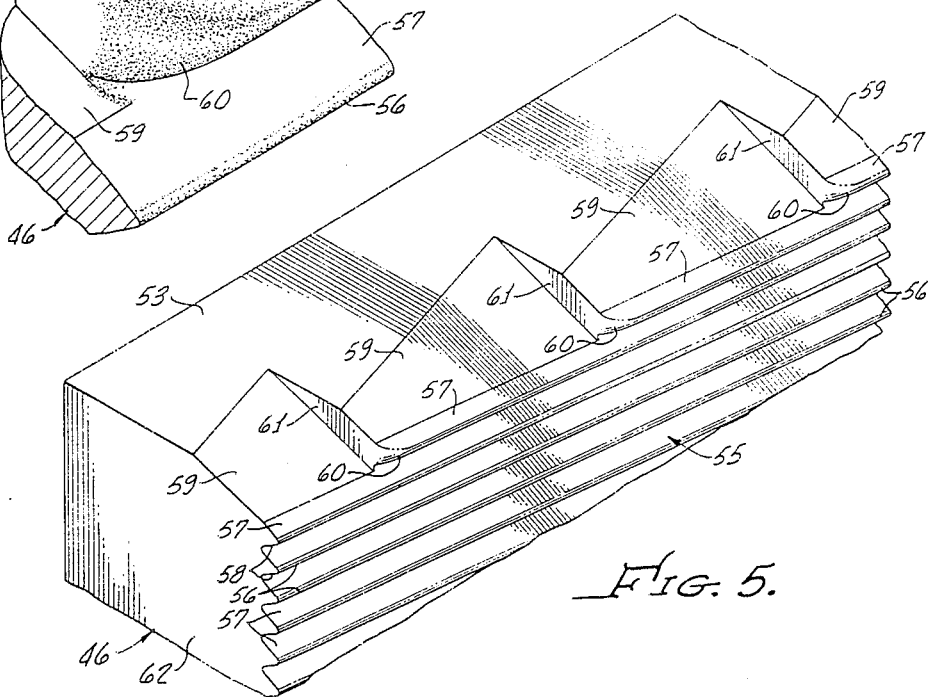

THREAD ROLLING AND FASTENER

BACKGROUND OF THE INVENTION

The rolling of threads has become accepted as the method for producing superior threads for externally-threaded fasteners. However, an unfortunate characteristic of rolled threads is the relatively long runout at the inner end of the thread where the thread contour is not complete. During the thread rolling process, the fastener blank is rolled between two opposed dies having ridges complementary to the thread to be produced. These ridges run out at one edge of the die, which is the location where the inner end of the thread is formed. Inasmuch as the ridges are at a shallow acute angle with respect to the die edge, a feather edge is produced on these ridges which is susceptible to breakage. Because of this, the ridges of the die are tapered as the die edge is approached, becoming more shallow at the edge to provide adequate strength at that portion of the die. As a result, two or more turns of the thread at its inner end usually will be incomplete, having less than the full cross-sectional dimension of the remainder of the thread. The incomplete thread can carry no load, and hence does nothing to enhance the performance of the fastener. However, the fastener shank must be made sufficiently long to include the runout thread at its inner end, as well as the portion of the thread that carries the load. Typically, the transition section where the thread runout occurs has a length axially of the shank corresponding to twice the pitch of the thread.

Many fasteners include a nut or collar with a counterbore to receive the transition zone of the bolt or pin that includes the incomplete runout thread. It is necessary for the counterbore of the nut or collar to have a length sufficient to accommodate the runout thread. Therefore, the length of both the bolt and nut are dictated by the requirement for the incomplete thread at the inner end of the threaded portion of the bolt.

It has been recognized that making the pin or bolt shorter by reducing the length of the transition zone with its incomplete threads would result in a saving in weight of considerable significance in the aircraft and aerospace fields, as well as other areas where minimizing weight is critical. Nevertheless, conventional thread rolling will not permit this.

One approach to reducing the length of the thread runout has been to first form a groove in the transition zone to approximately the minor diameter of the thread to be produced. This is accomplished prior to rolling the thread, either by cutting to the required geometry or by cutting to less than full dimension, followed by cold rolling to produce a groove of the desired depth. After this, the thread is rolled, with the runout extending into the grooved portion. The result is a thread runout transition zone shorter than that of a conventional fastener with a rolled thread. A drawback to this system is the increased expense incurred in the extra operation of forming the groove in the shank prior to the thread-rolling operation.

SUMMARY OF THE INVENTION

The present invention provides a fastener having a significantly shortened transition thread runout zone, yet without the necessity for producing a groove in the blank prior to the thread-rolling operation. The thread on the bolt has a relatively abrupt beginning at its inner end, achieving its full cross-sectional dimension much more rapidly than with conventional thread-rolling techniques. The inner end of the thread terminates in a wall, preferably rounded concavely, which is generally symmetrical about the longitudinal axis of the thread. The end wall is relatively short, extending lengthwise of the thread preferably no more than one-fourth the circumference of the thread at its pitch diameter. This permits the transition zone at the inner end of the thread to extend axially of the shank a distance no more than a length corresponding to the pitch of the thread. In other words, the transition zone is about half the length that it is in fasteners with conventional rolled threads. This permits the counterbore in the nut to be made shorter because it needs to accommodate only the shorter transition zone of the bolt. Therefore, there is a weight saving for both the nut and the bolt.

The ridges on the thread-rolling dies of this invention do not come to a feather edge as they run out on the edge of the die where the inner end of the thread is formed. Instead, they come to relatively abrupt ends which are generally symmetrical about longitudinal axes of the ridges rather than being elongated and extremely asymmetrical as in the conventional thread-rolling dies. The ends walls of the ridges are convexly rounded to produce the rounded inner ends of the threads.

As viewed in elevation, the end walls of the ridges that run out to the die edge increase very slightly in elevation from the end of the die where the blank enters to the end where it leaves. This is to assure that each ridge end reaches the inner end of the thread groove being produced in the blank. The increased elevation causes each die end to engage the blank slightly beyond the groove end as the blank turns between the dies. This is done because it is impossible to assure that each ridge end will strike the blank in exactly the same place as the blank is rolled between the dies. Therefore, the ridge ends are caused to engage the blank progressively further into the groove to ensure that the inner end of the groove is formed properly. The increment of added engagement at the end of the groove is kept small in order to protect the dies against breakage.

Fasteners in accordance with this invention are advantageous even where weight saving is not important. This is because the reduced length of the thread runout results in a longer grip length for the bolt. This means that a bolt will have increased versatility by being able to secure together articles of a greater range of thicknesses. This allows bolt inventory to be reduced because fewer sizes are necessary to accomplish a full range of fastening requirements.

BRIEF DESCRIPTION OF THE DRAWINGS

FIG. 3 is an enlarged fragmentary elevational view, showing the inner end portion of the thread of the fastener pin of FIG. 2;

FIG. 4 is a perspective view of the dies performing the thread rolling operation;

FIG. 5 is an enlarged fragmentary perspective view of one of the thread rolling dies;

FIG. 9 is an enlarged fragmentary view illustrating a typical contour of the end of the thread-forming ridge of the die.

DETAILED DESCRIPTION OF THE INVENTION

Figure 1:
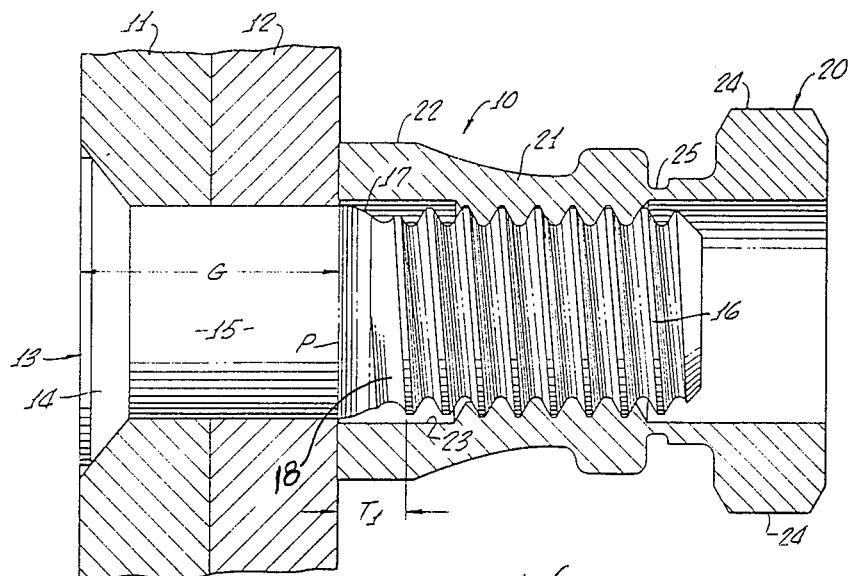
FIG. 1 is a longitudinal sectional view of a prior art fastener having rolled threads.

Illustrated in FIG. 1 is a prior art shear fastener 10, commonly used in the aircraft industry, shown here holding together panels 11 and 12. The fastener 10 includes a pin 13 having a flush head 14 from which projects a shank having three sections. The first section 15 of the shank adjacent the head 14 has a straight cylindrical exterior surface of a relatively large diameter. The outer end portion 16 of the shank includes a rolled thread with a major diameter less than the diameter of the section 15. Between the inner and outer portions of the shank is a shorter transition section 17 where the shank tapers from the diameter of the unthreaded section 15 to the smaller diameter outer portion 16. The pin 13 is capable of accommodating panels or other workpieces whose combined thickness does not exceed the grip length G, which is the distance from the outer plane of the flush head 14 to the transverse grip plane P at the end of the shank section 15.

The thread extends for the full length of the outer portion 16 of the shank and includes a gradual runout at its inner end portion 18 which extends into the transition section 17 of the shank. In accordance with conventional practices, the thread is incomplete at the runout portion 18, not having its full cross-sectional dimension in that zone. The portion of the pin 13 occupied by the runout of the thread, therefore, carries no load and cannot perform any useful work as the fastener is used. The length $T_1$ of the transition section 17 that includes the incomplete threads typically is around twice the pitch of the thread in order to accommodate the runout portion 18 of the thread.

Engaging the pin 13 is a collar 20 having an intermediate internally threaded portion 21 that meshes with the thread on the outer end 16 of the pin. The base part 22 of the nut 20, which bears against the panel 12, flares outwardly and includes a counterbore 23 dimensioned to receive the transition section 17 of the pin. At the other end, the collar 20 is unthreaded and includes external wrenching surfaces 24, inwardly of which is an external peripheral groove 25. The latter provides a frangible portion where the end of the nut can break off upon the exertion of a predetermined torque as the collar is tightened against the panel.

Figure 2:
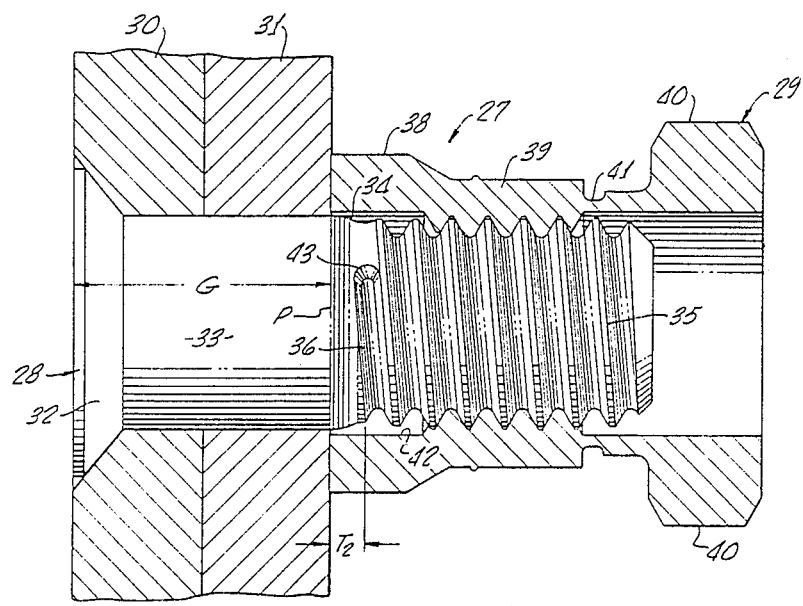
FIG. 2 is a longitudinal sectional view of a fastener made in accordance with the present invention.

Illustrated in FIG. 2 is a fastener 27 of the same type as that of FIG. 1, but made in accordance with the present invention. The fastener 27 of this invention includes a pin 28 and a collar 29 used in securing together panels 30 and 31, which are of the same thickness as the panels 11 and 12. The pin 28 includes a flush head 32 from which projects a shank having an unthreaded, relatively large-diameter portion 33 adjacent the head, a transition section 34 and an outer end portion 35 of reduced diameter on which is a rolled thread. The grip length G of the fastener pin 28, which is the length of the unthreaded shank portion 33 from the head 32 to the grip plane P at the beginning of the transition section 34, is the same as the grip length G of the fastener pin 13.

The threaded outer end portion 35 also is of a length equal to that of the threaded end 16 of the pin 13.

The thread on the pin 28 does not have the conventional runout of incomplete cross section at its inner end characteristic of the thread on the shank end 16. Instead, the inner end portion 36 of the thread has its full dimension almost to the point where it terminates. This enables the transition section 34 to be made shorter than the transition section 17 of the conventional fastener pin 13, because it does not have to accommodate a long thread runout. The length $T_2$ of the transition section 34 may be approximately equal to the pitch of the thread on the shank end 35. This contrasts with the transition section 17 of the conventional fastener which has a length equal to twice the thread pitch. Thus, although the grip length of the fastener pin is the same as before, and the threaded section is of equal length to that of the conventional fastener, the overall length of the pin has been reduced by the distance of one thread pitch. This means that at a longitudinal distance from the grip plane P corresponding to around one pitch of the thread, the thread will have its full dimension.

The collar 29 also is made shorter than the collar 20 of the conventional fastener. The collar 29 is similar in most respects to the collar 20, including an outwardly-flaring base portion 38, an intermediate, internally-threaded portion 39, and wrenching surfaces 40 on its outer end. A breakaway peripheral groove 41 also is included. However, the counterbore 42 of collar 29 is shorter than that of the collar 20. This is because the pin transition section 34 is of reduced length and a shorter counterbore will accommodate it. Accordingly, both components of the fastener are of reduced length, and a significant weight savings is realized.

Although the inner end of the thread begins abruptly, it is preferred to avoid a flat inner end wall at the terminus of the thread, and instead to provide a concave, rounded wall 43 of compound curvature. The resulting transverse end wall, which is generally symmetrical about the longitudinal axis of the thread, will provide some taper at the inner end part of the thread. This is to improve the life of the thread-rolling dies and to avoid stress risers which could result from sharp corners in the completed fastener. The resulting runout preferably is no greater in length than one-fourth the circumference of the pin at the pitch diameter, and frequently is less.

The thread on the pin 28 is produced by a pair of thread-rolling dies 46 and 47, as illustrated in FIG. 4. One of these, the die 46, is movable, while the die 47 is stationary. These dies are flat, but cylindrical dies also can be constructed embodying the principles of this invention. As shown in the drawing, the dies 46 and 47 are used to roll threads on the outer end part 48 of the shank of a blank 49, which is used to produce the completed fastener pin 28. The shank of the blank 49 has a portion 50 of larger diameter adjacent its head 51, and a short tapered transition surface 52 (better seen in FIG. 6) between the end part 48 and the portion 50.

Figure 6:
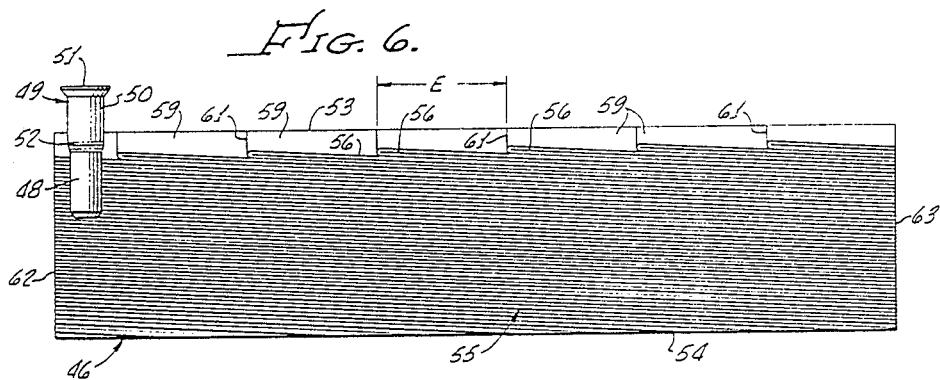
FIG. 6 is an elevational view of one of the thread rolling dies and the screw blank in position for the thread rolling operation.
Figure 7:
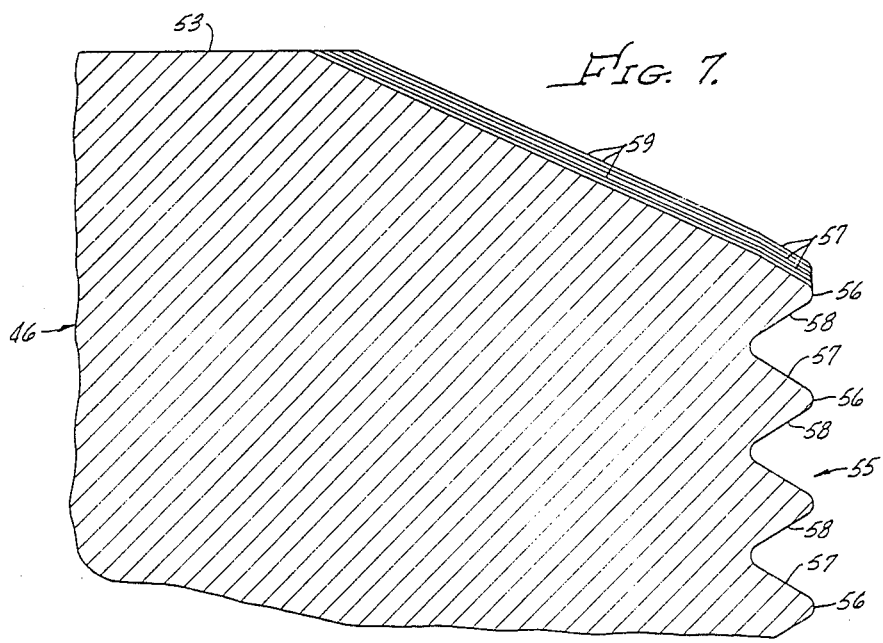
FIG. 7 is an enlarged fragmentary sectional view, taken along line 7—7 of FIG. 6.

The movable die 46, illustrated in enlarged detail in FIGS. 5, 6 and 7 is identical in configuration to the stationary die 47. The die 46 includes flat parallel longitudinal top and bottom edges 53 and 54, and a vertical face 55 which is used in producing the thread. Formed on the face 55 is a series of parallel ridges 56 which are complementary to the thread to be produced, and therefore generally V-shaped in end elevation. In accordance with standard practice, these ridges include flanks 57 and 58 with a 60° included angle between them. The ridges 56 are at an acute angle relative to the top and bottom edges 53 and 54, appropriate for producing a thread helix when the blank 49 is rolled between the dies.

Between the top edge surface 53 of the die and the face 55 is a stepped, beveled surface 59 which forms a part of the upper die edge. This surface is at an angle of 25° relative to the top edge surface 53. Accordingly, the stepped surface 59 is at only a 5° differential with respect to the upwardly-facing flanks 57 of the ridges 56 that run out at the surface 59. In practice, the surface 59 is made to blend with the flanks 57 that it intersects. The vertical dimension of the surface 59 should be equal to at least twice the pitch of the thread to be produced to assure adequate clearance as the thread is formed.

The ridges 56 that intersect the stepped surface 59 have relatively abrupt ends 60 which preferably are convexly rounded, with compound curvature. As a result, the ridges 56 have their full cross-sectional dimension, symmetrical on either side of their longitudinal axes, at a location close to where they terminate. The only runout of the ridges is provided by the transverse rounded ends 60, which are generally symmetrical about the ridge axes. Preferably, this runout does not exceed one-fourth of the circumference of the thread to be produced at its pitch diameter.

The rounded ends 60 of the ridges 58 that extend to the surface 59 blend smoothly into flat, narrow surfaces 61 which extend to the top edge 53 surface of the die. This results in the stepped configuration of the beveled surface 59, dividing it into segments, each of which connects to the flank 57 of one of the ridges 56. The surfaces 61 are transverse with respect to the ridges 56, being perpendicular to the longitudinal axes of the ridges.

Lengthwise of the die, the ridge ends 60 are spaced apart a distance E that is approximately the same as the circumference of the thread to be produced at its pitch diameter. This encompasses some variation from the precise circumferential distance. For example, the distance E for a die to produce a fastener pin of titanium may fall within the range of around $\pi \times 0.8 \times$ pitch diameter of the thread to $\pi \times 1.0 \times$ pitch diameter of the thread.

Figure 8:
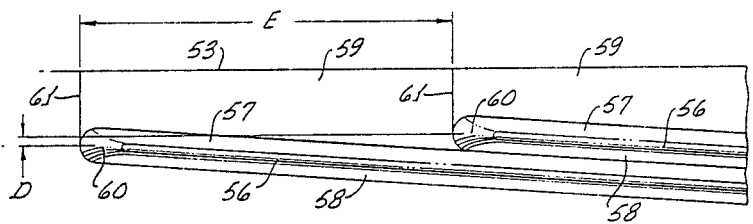
FIG. 8 is an enlarged fragmentary elevational view of a portion of one of the thread rolling dies.

The spacing between the ridge ends 60 is made such that there is an increase in height from one to the next from the die end 62, where the thread rolling begins, to the opposite end 63. This effect is illustrated in FIG. 8, and can be seen in FIGS. 6 and 7, as well. As shown in FIG. 8, the ridge end 60 on the right (toward the die end 63) is closer to the top die edge surface 53 by a small distance D than is the ridge end 60 on the left. The same height differential D of adjacent ridge ends applies throughout the length of the die.

The dies of this invention are operated as conventional dies, with one die 46 being moved longitudinally relative to the other die 47. The screw blank 49 is positioned prior to the threading operation as shown in FIGS. 4 and 6, which locates it adjacent the end 62 of the die 46 and perpendicular to the die edge surface 53. Therefore, the inner end 43 of the screw thread that is produced as the dies are actuated is formed by the rounded ends 60 of the ridges 56. The result is the relatively abrupt termination of the screw thread at its inner end, as described above.

The gradual increase in elevation of the ends 60 of the ridges 56 from the die end 62 to the die end 63 is to make certain that each of the ends 60 will strike the screw blank at the inner end of the groove being produced to form the thread. This is because it is impossible, as a practical matter, to have each end 60 engage the screw blank at precisely the same location. Therefore, the gradual increase in height of the ridge ends 60 assures that each successive ridge engages the blank at a position slightly beyond where the preceding ridge had engaged it. At the same time, the increase in height is small from one ridge to the next, so that only a small increment of the unformed portion of the screw blank is engaged by the end of the ridge of the die. This avoids breakage of the ends of the die ridges.

The beveled surface 59 is beneficial in providing clearance at the inner end of the thread being produced, again protecting the ridges of the die to avoid breakage.

As illustrated, the end surface 60 of each ridge 56 is symmetrical about the longitudinal axis of the ridge in order to produce the symmetrical inner end 43 of the thread. In actual practice, if the ends of the ridges are polished by hand to produce the curved end walls 60, they will not achieve a precise geometric symmetry, as the exposed side of the ridge at the flank 57 normally may be cut away a small amount more than on the side of the flank 58. As used herein, the term "generally symmetrical" as applied to the end of the ridge and the end of the thread is intended to include such deviations.

Although illustrated with respect to a fastener having three shank sections, the invention can be applied to fasteners having a uniform shank diameter. The inner end of the rolled thread then will terminate abruptly, as in the embodiment described, but in a straight shank section rather than a tapered transition zone.

The foregoing detailed description is to be clearly understood as given by way of illustration and example only, the spirit and scope of this invention being limited solely by the appended claims.

What is claimed is:

1. A thread rolling die comprising
    a member having a plurality of spaced parallel ridges on one side thereof at an acute angle to one edge thereof,
    said ridges being complementary to a thread to be produced,
    certain of said ridges having end surfaces adjacent said one edge of said member which are transverse to the longitudinal axis of said ridges, and said one edge of said member includes a beveled surface extending to said certain ridges and a second surface connected to said beveled surface, said ends of said certain ridges being progressively closer to said second surface from one end of said member to the other,
    said certain ridges providing a relatively abrupt transition from said end surfaces to the full dimensions thereof for providing a relatively abrupt inner end to a thread being produced by said member.

2. A threaded fastener comprising
    a member having a head at one end and a shank projecting from said head,
    said shank including an unthreaded cylindrical first portion of predetermined length adjacent said head, a second portion of predetermined length at the outer end thereof having a rolled thread thereon of uniform dimension throughout the length of said second portion and having a major diameter no greater than the diameter of said first portion, and a third portion interconnecting said first and second portions and extending axially a predetermined length and differing in diameter from said first and second portions, said rolled thread ending within the length of said third portion of said shank as an inner end part which end part has less than said uniform dimension and extends no more than one-fourth the circumference of said rolled thread at its pitch diameter so as to provide an abrupt end transition from said full dimension to the inner end of said thread, said inner end part including a generally symmetrical rounded transverse surface about a longitudinal axis of said thread, said third portion of said shank having an axial dimension not exceeding approximately a distance corresponding to one pitch of said thread.

3. In a threaded fastener of the type having a member having a head at one end and a shank projecting from said head, said shank including an unthreaded cylindrical first portion of predetermined length adjacent said head, a second portion of predetermined length at the outer end thereof having a rolled thread thereon of uniform dimension throughout the length of said second portion and having a major diameter no greater than the diameter of said first portion, and a third portion interconnecting said first and second portions and extending axially a predetermined length and differing in diameter from said first and second portions, the improvement comprising said rolled thread ending in said third portion of said shank as an inner end part which end part has less than said uniform dimension and extends rotationally no more than one-fourth the circumference of said rolled thread at its pitch diameter and which extends axially a distance no greater than substantially the pitch of said rolled thread so as to provide an abrupt end transition from said full dimension to the inner end of said thread, thereby to minimize the length and weight of said fastener, said inner end part including a generally symmetrical rounded transverse surface about a longitudinal axis of said thread.

4. The method of producing a threaded fastener which is lighter and more compact than a conventional fastener which has a head and a shank projecting from said head, which shank includes a first unthreaded part of a first diameter adjacent said head, said first part having a first predetermined length and cooperating with said head to define the grip length of said conventional fastener, a second part of a second and smaller diameter and a second predetermined length at the outer end thereof, said second part having a rolled thread thereon of a predetermined pitch and a substantially constant full dimension for the full length of said second part, and a transition part of a length equal to approximately twice said pitch of said thread interconnecting said first and second parts, said thread including an elongated tapered inner end part of less than said full dimension in said transition part of said shank, comprising the steps of providing a blank having a head, and a shank extending from said head of said blank, with said shank of said blank having a first part of said first diameter and first predetermined length adjacent said head of said blank, a second part of said second diameter and second predetermined length at the outer end thereof, and a transition part interconnecting said first and second parts and extending axially a predetermined length and differing in diameter from said first and second parts, and then rolling a thread on said second part of said shank of said blank such that said thread has said predetermined pitch and a substantially constant dimension for the entire length of said second part of said shank, and simultaneously with said rolling of a thread on said second part rolling an inner termination of said thread in said transition part so as to provide an abrupt end of said thread at said inner termination thereof which is of less than said substantially constant dimension and extends rotationally for no more than one-fourth the circumference of said thread at its pitch diameter and which extends axially of said shank a distance substantially no greater than the pitch of said thread rolled on said shank of said blank.

5. The method of providing a lightweight, compact fastener having a head, and a shank having an unthreaded cylindrical portion adjacent said head, an outer end portion having a rolled thread thereon of a predetermined pitch and predetermined uniform configuration, and a transition part between said unthreaded cylindrical portion and said outer end portion having the runout of the inner end of said thread thereon, comprising the steps of providing a duality of dies, each of said dies being provided with a plurality of parallel ridges having opposite flanks and having a configuration which is complementary in cross section to said predetermined uniform configuration, positioning said ridges on each of said dies so as to be at an acute angle with respect to one edge of said die and so that certain of said ridges terminate adjacent said edge, one of said flanks of each of said certain ridges being positioned in juxtaposition with said edge and the opposite of said flanks of said certain ridges being remote from said edge, providing a convexly curved generally symmetrical end surface on each of said certain ridges extending between the ends of said flanks, so as to provide an abrupt transition from said configuration to the end of each said certain ridges which does not extend axially of said certain ridges a distance greater than one-fourth of the circumference of said rolled thread at its pitch diameter, providing a blank having a head and a cylindrical shank projecting from said head, with a first section of relatively large diameter adjacent said head, a second section of relatively small diameter at the outer end of said shank, and a transition section interconnecting said first and second sections and axially extending a predetermined length and differing in diameter from said first and second sections, the length of said transition section being substantially equal to said predetermined pitch, then positioning said shank between said dies and relatively moving said dies so as to cause said ridges to engage and form a thread of said predetermined uniform configuration and predetermined pitch on said second section of said blank, with said end surfaces of said certain ridges engaging only said transition section to form the end of said thread therein so as to provide a relatively abrupt change in said thread from said end of said thread to the full dimension thereof which extends for less than one-fourth the circumference of said thread at the pitch diameter thereof.

* * * * *